(12) United States Patent
Kvist et al.

(10) Patent No.: US 8,899,362 B2
(45) Date of Patent: Dec. 2, 2014

(54) WORK MACHINE

(75) Inventors: Roland Kvist, Braás (SE); Marcus Miller, Växjö (SE); Kajsa Dymling, Akarp (SE); Jonas Thoursie, Växjö (SE); Per-Olof Bergqvist, Växjö (SE)

(73) Assignee: Volvo-Construction Equipment AB, Eskilstuna (SE)

( * ) Notice: Subject to any disclaimer, the term of this patent is extended or adjusted under 35 U.S.C. 154(b) by 740 days.

(21) Appl. No.: 12/919,813

(22) PCT Filed: Feb. 26, 2009

(86) PCT No.: PCT/SE2009/000111
§ 371 (c)(1),
(2), (4) Date: Aug. 27, 2010

(87) PCT Pub. No.: WO2009/108104
PCT Pub. Date: Sep. 3, 2009

(65) Prior Publication Data
US 2011/0005848 A1 Jan. 13, 2011

(30) Foreign Application Priority Data
Feb. 29, 2008 (SE) .................................. 0800492-1

(51) Int. Cl.
*B60K 6/42* (2007.10)
*B62D 53/00* (2006.01)
*B62D 59/04* (2006.01)
*B60K 17/356* (2006.01)

(52) U.S. Cl.
CPC ........... *B62D 59/04* (2013.01); *B60Y 2200/147* (2013.01); *B60Y 2200/142* (2013.01); *B62D 53/005* (2013.01); *B60Y 2200/14* (2013.01); *B60K 17/356* (2013.01)
USPC ....................................... 180/65.22; 180/165

(58) Field of Classification Search
USPC .............. 180/65.21, 65.22, 65.1, 65.6, 65.31, 180/243, 235, 248, 245
See application file for complete search history.

(56) References Cited

U.S. PATENT DOCUMENTS 3,789,942 A * 2/1974 Kowalik ........................ 180/9.44
3,860,081 A * 1/1975 Moll et al. .................... 180/14.3
(Continued)

FOREIGN PATENT DOCUMENTS

EP 1918180 A1 5/2008

OTHER PUBLICATIONS

International Search Report for corresponding International Application PCT/SE2009/000111.
(Continued)

*Primary Examiner* — John Walters
*Assistant Examiner* — James Triggs
(74) *Attorney, Agent, or Firm* — WRB-IP LLP

(57) ABSTRACT

A work machine includes a front section with a front frame, a first set of ground engaging members and a power source for propelling the work machine, a rear section with a rear frame, a second set of ground engaging members and a load-carrying container. The rear section includes an electric drive system adapted for driving at least one ground engaging member of the second set. The rear section is detachably connected to the front section. The power source of the front section is adapted to power the electric drive system in the rear section in an attached state of the front and rear sections. The electric drive system is adapted for driving the at least one ground engaging member of the second set for self-propelling of the rear section in a detached state.

13 Claims, 3 Drawing Sheets

(56) References Cited

U.S. PATENT DOCUMENTS 8,215,436 B2 * 7/2012 DeGrave et al. .............. 180/165
2004/0226760 A1   11/2004 Loh et al.
2008/0245585 A1 * 10/2008 Brathe et al. ............... 180/24.04

OTHER PUBLICATIONS

International Search Report for corresponding International Application PCT/SE2009/000111 Aug. 27, 2010.

* cited by examiner

WORK MACHINE

BACKGROUND AND SUMMARY

The present invention relates to a work machine comprising a front section with a front frame, a first set of ground engaging members and a power source for propelling the work machine, a rear section with a rear frame, a second set of ground engaging members and a load-carrying container.

The invention will below be described for an articulated hauler. This should however be regarded as a non-limiting example. The invention may be realized in other types of work machines, such as dump trucks or other construction equipment having a tractor unit and a trailer unit which are pivotally connected to each other. The expression "work machine" is also intended to comprise heavy vehicles to be used on regular roads, such as trucks having a front section (tractor or semitrailer tractor unit) and a rear section (trailer or semi-trailer unit) pulled by the front section.

Further terms frequently used for work machines are "earth-moving machinery", "off-road work machines", "construction equipment" and "forest machines". The term "ground engaging members" may comprise wheels, caterpillar tracks etc.

In connection with transportation of heavy loads, e.g. in contracting work, a work machine of the type of an articulated hauler is frequently used. Such vehicles may be operated with large and heavy loads in areas where there are no roads, for example for transports in connection with road or tunnel building, sand pits, mines, forestry and similar environments. Thus, an articulated hauler is frequently used in rough terrain with various slippery ground.

The front frame carries a power source in the form of an internal combustion engine and a load-carrying container is arranged on the rear frame of an articulated hauler. An articulated hauler is further defined by a first pivot joint arranged to allow the front frame and the rear frame to pivot in relation to each other around an imaginary longitudinal axis, that is an axis that runs in the longitudinal direction of the vehicle. Travelling on uneven ground is substantially improved by virtue of such a joint.

The articulated hauler further has a second, vertical pivot joint between the front frame and the rear frame and a pair of hydraulic cylinders for steering the work machine via pivoting the front frame relative to the rear frame about the vertical pivot axis. It is emphasized that a frame-steered work machine is adapted for an optimized off road performance with regard to any vehicle with Ackerman steering (front wheel steering). More specifically, the articulated steering creates conditions for using much larger (both with regard to diameter and width) front wheels than with so-called Ackermann steering. Further, articulated steering creates conditions for 100% lock in the front axle differential (which is not possible with Ackermann steering), which is essential when operating on slippery ground.

Further, an articulated hauler normally has six wheels.

The front section comprises a front wheel axle and the rear section comprises a pair of bogie axles. A powertrain is adapted to drive the three wheel axles. Thus, the articulated hauler may be operated with all (6) wheel drive.

Each axle is provided with a differential gear and a (transverse) differential lock. Further, one longitudinal differential lock is provided on the transmission shaft between the front axle and the bogie axles and a further longitudinal differential lock is provided on the transmission shaft between the bogie axles. The differential locks are preferably engaged when there is a risk of the wheels slipping. According to an alternative design, any of the differential locks may be replaced by a device allowing limited slip.

It is desirable to achieve a work machine, which creates conditions for a more flexible operation.

In a work machine according to an aspect of the present invention, the rear section comprises an electric drive system adapted for driving at least one ground engaging member of said second set, that the rear section is detachably connected to the front section, that the power source of the front section is adapted to power the electric drive system in the rear section in an attached state of the front and rear sections, and that said electric drive system is adapted for driving said at least one ground engaging member of said second set for self-propelling of the rear section in a detached state.

Thus, the invention is particularly directed, according to an aspect thereof, to a hybrid electric work machine.

Thus, the rear section can be maneuvered after disconnection. In other words, the invention creates conditions for detaching the rear section and self-propelling the rear section short distances.

Preferably, a control system is adapted for remote control of the rear section in order to maneuver it in the detached state. The control system is preferably adapted for communication between a remote unit and the detached rear section via radio waves.

According to an example, the electric drive system comprises at least one electric motor. The electric motor creates conditions for an infinitely variable torque distribution between the wheels which is advantageous when operating in severe terrain conditions.

According to a preferred embodiment, the power source comprises an electric machine for providing electric power. Preferably, the power source comprises means for generating mechanical power and the electric machine is operatively connected to the mechanical power generating means for converting the mechanical power to electric power. Especially, the means for generating mechanical power is constituted by an internal combustion engine and the electric machine forms a generator. Alternatively, the electric machine may be adapted to generate electric power directly (for example a fuel cell).

Further, torque may be infinitely variably supplied to the rear wheels in order to support the front wheel drive in certain (slippery) conditions.

Further preferred embodiment and advantages thereof emerge from the description below, the figures and the claims.

BRIEF DESCRIPTION OF FIGURES

The invention will be described in greater detail below with reference to the embodiment shown in the accompanying drawings, in which.

DETAILED DESCRIPTION

Figure 1:
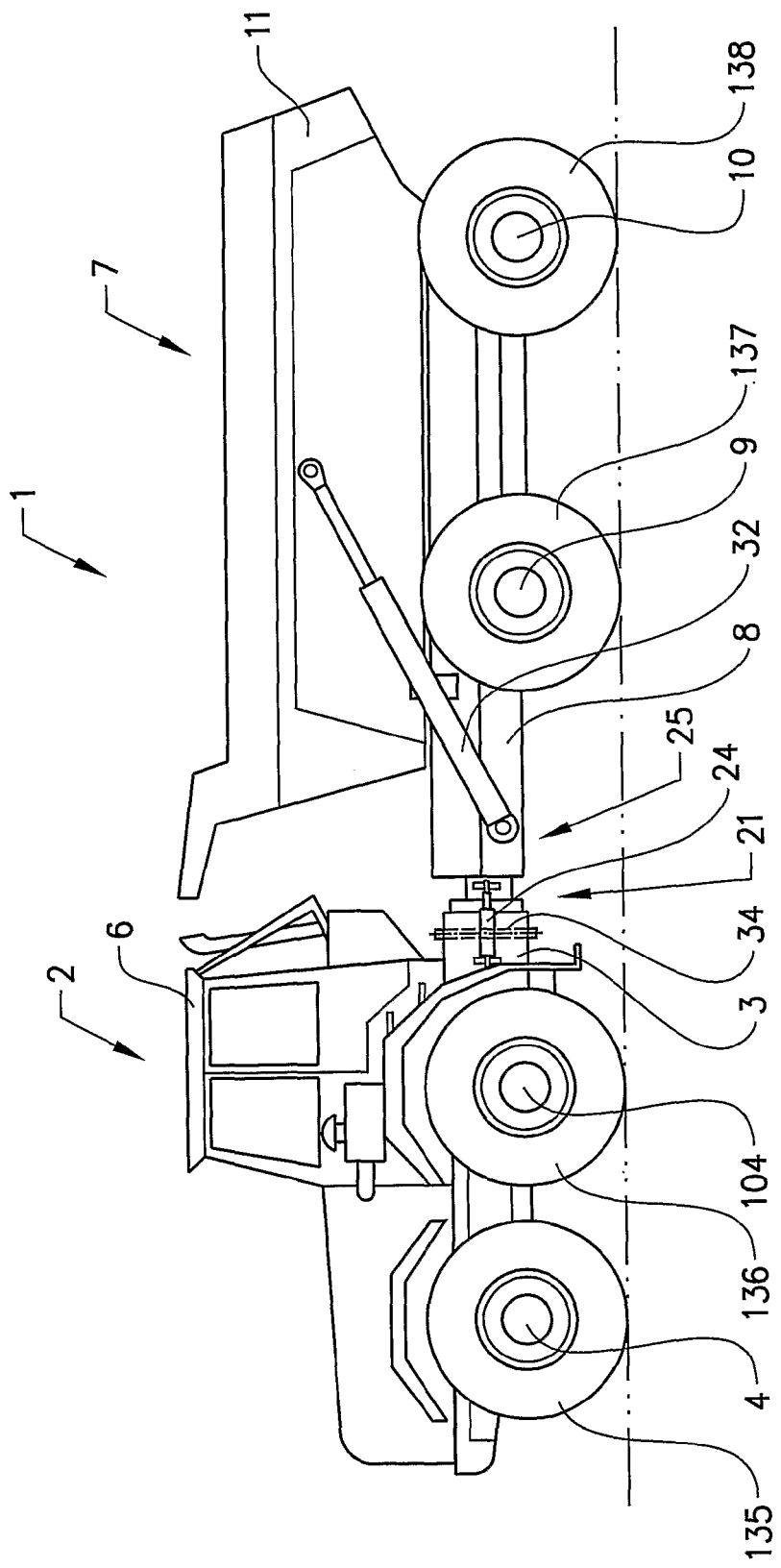
FIG. 1 shows a work machine according to a first embodiment in an attached state in a side view.

FIG. 1 shows an articulated hauler (also called frame-steered dumper) 1 in a side view. The articulated hauler comprises a front vehicle section 2 (pull unit or tractor) comprising a front frame 3, a front wheel axle 4, a rear wheel axle 104 and a cab 6 for a driver. Each axle 4, 104 comprises a left ground engagement element 135, 136 and a right ground engagement element 235, 236 (see FIG. 3) in the form of wheels. The articulated hauler 1 also comprises a rear vehicle section 7 (trailer) comprising rear wheels 137, 237, 138, 238 (see FIG. 3) and a tiltable container 11.

A first pivot joint 25 is adapted in order to allow the front frame 3 and the rear frame 8 to be pivoted relative to one another about an imaginary longitudinal axis, that is to say an axis which extends in the longitudinal direction of the vehicle 1.

The front frame 3 is connected to the rear frame 8 via a second joint 21 which allows the front frame 3 and the rear frame 8 to be pivoted relative to one another about a vertical axis 34 for steering (turning) the vehicle. Actuators in the form of a pair of hydraulic cylinders 24 are arranged on respective sides of the rotary joint 21 for steering the vehicle. The hydraulic cylinders are controlled by the driver of the vehicle via a wheel and/or a joystick (not shown).

The container 11 is connected to the rear frame 8 via an articulation (not shown) at a rear portion of the rear frame 8. A pair of tilting cylinders 32 are connected to the rear frame 8 with a first end and connected to the platform body 11 with a second end. The tilting cylinders 32 are positioned one on each side of the central axis of the vehicle in its longitudinal direction. The platform body 11 is therefore tilted in relation to the rear frame 8 on activation of the tilting cylinders 32.

Figure 2:
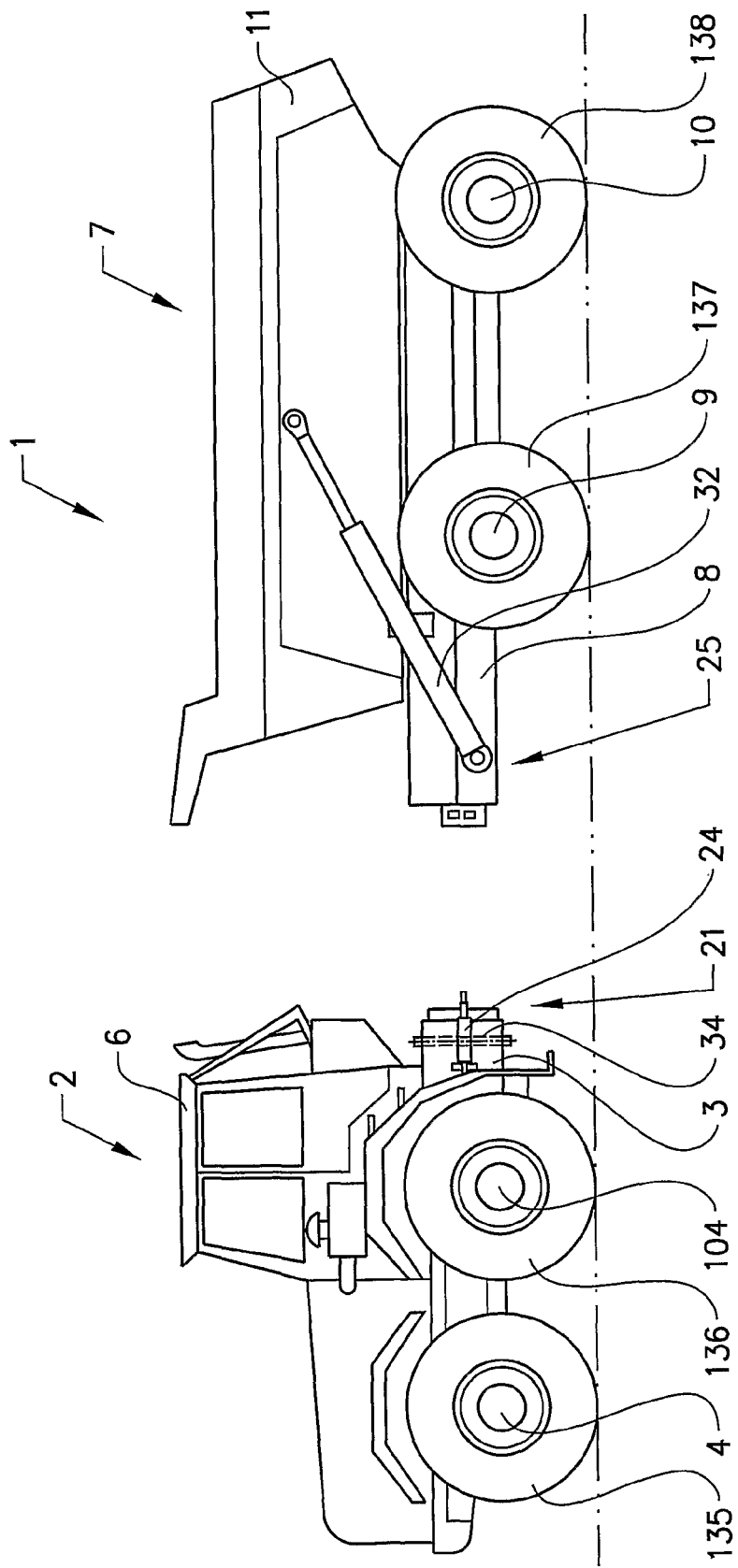
FIG. 2 shows the work machine in FIG. 1 in a detached state in a side view.

FIG. 2 shows the work machine 1 in a detached state, wherein the rear section 7 is detached from the front section 2. The vehicle turning system, comprising the hydraulic cylinders 24 and the second joint 21, is preferably arranged on the front section 2 in the detached state. The hydraulic cylinders are preferably automatically released and reconnected, respectively between the front and rear sections in operation.

Figure 3:
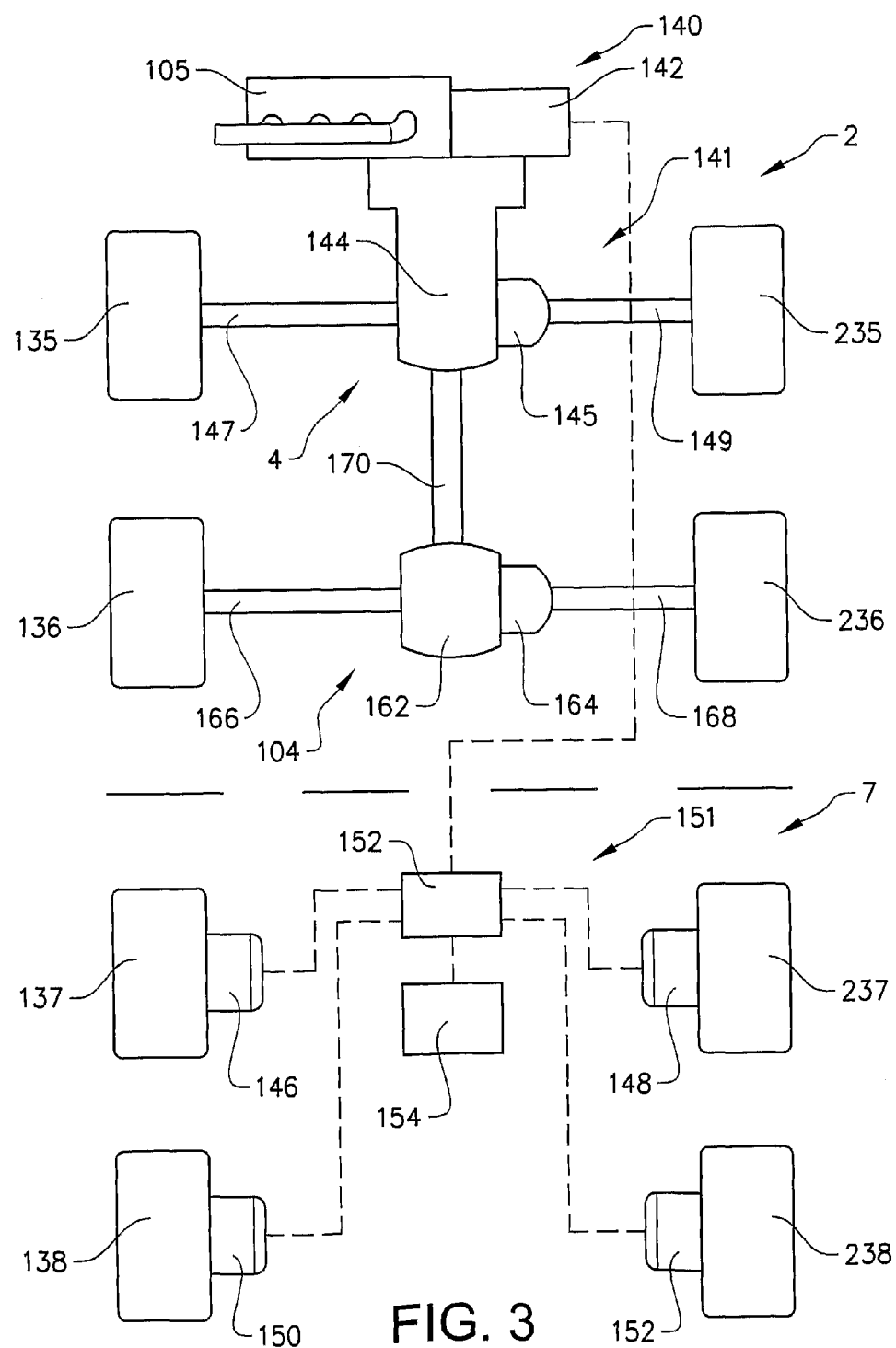
FIG. 3 schematically shows an exemplary powertrain of the work machine.

FIG. 3 schematically shows a powertrain according to a first embodiment of the present invention. The powertrain comprises a power source 140. The power source 140 comprises means for generating mechanical power 105 and an electric machine 142 operatively connected to the mechanical power generating means 105 for converting the mechanical power to electric power. The mechanical power generating means 105 comprises an internal combustion engine in the form of a diesel engine.

The powertrain further comprises means 141 for mechanical transmission of power from the internal combustion engine 105 to the ground engaging members 135, 136, 235, 236 of said section. The mechanical power transmission means 141 comprises a gear box 144 and the axle 4 adapted to drive the front wheels 135, 235. The mechanical power transmission means 141 preferably comprises a combined gear box 144 and transmission unit for transmitting power from the internal combustion engine 105 to a pair of transverse drive shafts 147, 149. The transmission unit may comprise a toothed wheel gearing, bevel gears and cardan shaft, belt drive or chain drive or other transmission member for performing said power transmission. The transmission unit further preferably comprises a differential gear adapted to transmit power to said pair of ground engaging members and a differential lock 145 adapted to lock the pair of transverse drive shafts 147, 149 together.

The rear axle 104 of the front section 2 comprises a differential gear 162 adapted to transmit power to said pair of wheels 136, 236 and a differential lock 164 adapted to lock a pair of transverse drive shafts 166, 168 together. The front axle 4 is mechanically connected to the rear axle 104 for power transmission via a drive shaft 170, such as a cardan shaft.

At least one electric motor 146, 148, 150, 152 is adapted for driving at least one ground engaging member 137, 237, 138, 238 in the rear section, preferably via a reduction gear. More specifically, a plurality of electric motors 146, 148, 150, 152 are adapted for driving one of said ground engaging members 137, 237, 138, 238 each. Thus, four electric motors are arranged, one at each wheel.

The work machine further comprises means 151 for electrical transmission of power from the electric machine 142 to said at least one electric motor 146, 148, 150, 152. The work machine further comprises a power electronic unit 152 adapted to distribute electric power to the respective electric motors 146, 148, 150, 152. The dotted lines in FIG. 3 indicate lines for transmission of electric current.

Both the front and the rear section 2,7 requires electrical mating contacts (not shown) for enabling attaching and detaching the front and the rear section 2,7. The electrical contacts are preferably automatically released and reconnected, respectively between the front and rear sections in operation. The electrical contacts are preferably positioned within the boundaries of the first pivot joint 25.

Further, the work machine comprises at least one electric power storing means 154, which is operatively connected to said at least one electric motor 146, 148, 150, 152. The electric power storing means 154 is operatively connected to the power electronic unit 152. Said at least one electric power storing means 154 is preferably positioned between two spaced, elongated frame members in the rear section which extend in a longitudinal direction of the work machine.

The electric motors 146, 148, 150, 152 are adapted for both driving and braking the driving wheels 137, 237, 138, 238.

According to an alternative to the described first embodiment, in addition to the mechanical drive of the front wheels 135, 235, at least one electric motor is adapted to drive the front wheels 135, 235. Preferably, one electric motor is adapted to drive an individual wheel 135, 235.

Further, the work machine comprises a control system (not shown) for controlling the power distribution. The control system comprises a control unit with software for controlling the power distribution. Thus, the control unit is connected to the energy storage means 154 for controlling transfer of power to and from the energy storage means according to an established control strategy, see further below.

The control unit is commonly known as an Electronic Control Unit (ECU), a Central Processing Unit (CPU) or an Electronic Control Module (ECM) for an electronic control of the vehicle operation. In a preferred embodiment, the control unit comprises a microprocessor. The control unit comprises a memory, which in turn comprises a computer program with computer program segments, or a program code, for implementing the control method when the program is run. This computer program can be transmitted to the control unit in various ways via a transmission signal, for example by downloading from another computer, via wire and/or wirelessly, or by installation in a memory circuit. In particular, the transmission signal can be transmitted via the Internet.

Regarding steering of the front vehicle section 2 in the detached state, the front wheel axle 4 is preferably steered, such as via so-called Ackerman-steering. Further, the front section 2 may be provided with a front wheel steering lock, wherein, in the attached state, the front wheel steering can be locked. Thus, the work machine is frame-steered in the attached state, see description above.

The invention is not to be regarded as being limited to the illustrative embodiments described above, but a number of further variants and modifications are conceivable within the scope of the patent claims below.

As an alternative to the described first embodiment, the rear section of the work machine comprises at least two axles, and that each axle is adapted to drive a ground engaging member at each side of the work machine. One single electric motor may be adapted to drive each axle. Thus, a single electric motor is adapted to drive each pair of wheels.

Within the scope of the invention, the power source can be designed in many different ways. Preferably, it is adapted to provide electricity. One option is to use a fuel cell for providing electricity. A further solution is to use a gas turbine provided with an electric generator. The source of electric power can also be a free-piston engine provided with an electric generator.

The electricity for propelling the work machine can come from a variety of sources, such as stored energy devices relying on chemical conversions (batteries), stored electrical charge devices (capacitors), stored energy devices relying on mechanical stored energy (e.g. flywheels, pressure accumulators) end energy conversion products.

According to an alternative to that the rear wheels 136, 236 of the front section 2 are mechanically driven via power transmission from the engine 105, they may be electrically driven via electric motors in a similar manner as has been described above for the wheels of the rear section.

According to an alternative design to the trailer embodiment shown in FIGS. 1 and 2, the front and rear wheels may be movably arranged in the longitudinal direction of the work machine. Especially, the front wheels may be adapted to be arranged close to the rear wheels, below a rear part of the container, in a first state and below a front part of the container in a second state. The rear section can be equipped with swing arms or any other system to reposition the wheels, after disconnection, in order to balance the vessel. For example, the front and rear wheels may be repositioned relative to one another via electrical means. Said electrical means is preferably operatively connected to the electrical drive system for receiving electrical power therefrom.

According to an alternative design to the trailer embodiment shown in FIGS. 1 and 2, the front section may only be provided with a single pair of drive wheels. The front section may comprise a gyroscope self-balancing system for balancing the front section in the detached state.

The invention claimed is:

1. An articulated work machine comprising
a front section with a front frame, a first set of ground engaging members and a power source for propelling the work machine,
a rear section with a rear frame, a second set of ground engaging members and a load-carrying container, wherein
the rear section comprises an electric drive system adapted for driving at least one ground engaging member of the second set,
the rear section is detachably connected to the front section,
the power source of the front section is adapted to power the electric drive system in the rear section in an attached state of the front and rear sections, and
the electric drive system is adapted for driving the at least one ground engaging member of the second set for self-propelling of the rear section in a detached state,
wherein at least one pivot joint is arranged between the front section and the rear section to allow the front section to pivot with regard to the rear section in the attached state about an axis extending in a vertical direction of the work machine, and wherein the steering means comprises a hydraulic actuator arranged on each side of the at least one pivot joint.

2. The articulated work machine according to claim 1, wherein the electric drive system comprises at least one electric motor.

3. The articulated work machine according to claim 2, wherein the electric drive system comprises at least one electric power storing means, which is operatively connected to the at least one electric motor.

4. The articulated work machine according to claim 2, wherein the work machine comprises at least two electric motors and that each electric motor is adapted to drive an individual around engaging member.

5. The articulated work machine according to claim 1, wherein the power source comprises means for generating mechanical power.

6. The articulated work machine according to claim 5, wherein the means generating mechanical power comprises an internal combustion engine.

7. The articulated work machine according, to claim 6, wherein the front section comprises means for mechanical transmission of power from the mechanical power generating means to the first set of ground engaging members.

8. The articulated work machine according to claim 1, wherein the power source comprises an electric machine for providing electric power.

9. The articulated work machine according claim 5, wherein the power source comprises and electric machine for providing electric power and the electric machine is operatively connected to the means for generating mechanical power for converting the mechanical power to electric power.

10. The articulated work machine according to claim 8, wherein the work machine comprises means for electrical transmission of power from the electric machine to the at least one electric motor.

11. The articulated work machine according to claim 10, wherein the work machine comprises at least one pivot joint between the front section and the rear section allowing the front section to pivot with regard to the rear section in the attached state, and the electrical transmission means comprises a line for transmission of electric power to the electric motor and that the electric power transmission line extends through the pivot joint.

12. The articulated work machine according to claim 1, wherein the work machine the at least one pivot joint comprises a first pivot joint adapted to allow the front section to pivot with regard to the rear section about an axis extending in a longitudinal direction of the work machine.

13. An articulated work machine comprising
a front section with a front frame, a first set of ground engaging members and a power source for propelling the work machine,
a rear section with a rear frame, a second set of ground engaging members and a load-carrying container, wherein
the rear section comprises an electric drive system adapted for driving at least one ground engaging member of the second set,
the rear section is detachably connected to the front section,
the power source of the front section is adapted to power the electric drive system in the rear section in an attached state of the front and rear sections, and
the electric drive system is adapted for driving the at least one ground engaging member of the second set for self-propelling of the rear section in a detached state,
wherein the work machine comprises at least one pivot joint between the front section and the rear section allowing the front section to pivot with regard to the rear section in the attached state, and a second pivot joint adapted to allow the front section to pivot with regard to the rear section about an axis extending in a vertical direction of the work machine, and wherein the steering means comprises a hydraulic actuator arranged on each side of the second pivot joint.

* * * * *